US008830186B2

(12) United States Patent
Jeong et al.

(10) Patent No.: US 8,830,186 B2
(45) Date of Patent: Sep. 9, 2014

(54) TOUCH SCREEN PANEL

(75) Inventors: Hwan-Hee Jeong, Yongin (KR); Sung-Ku Kang, Yongin (KR); Jung-Mok Park, Yongin (KR); Choon-Hyop Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 422 days.

(21) Appl. No.: 12/926,792

(22) Filed: Dec. 9, 2010

(65) Prior Publication Data
US 2011/0242019 A1 Oct. 6, 2011

(30) Foreign Application Priority Data

Apr. 1, 2010 (KR) ........................ 10-2010-0029951

(51) Int. Cl.
G06F 3/041 (2006.01)
G06F 3/045 (2006.01)
G06F 3/044 (2006.01)

(52) U.S. Cl.
CPC ............... *G06F 3/044* (2013.01); *G06F 3/045* (2013.01)
USPC ........................................................ 345/173

(58) Field of Classification Search
CPC ................................. G06F 3/044; G06F 3/045
USPC ................................................ 345/173–178
See application file for complete search history.

(56) References Cited

U.S. PATENT DOCUMENTS

| 2005/0030048 A1* | 2/2005 | Bolender et al. ............... 324/661 |
| 2008/0264699 A1 | 10/2008 | Chang et al. |
| 2008/0309635 A1 | 12/2008 | Matsuo |
| 2011/0096018 A1* | 4/2011 | Lee et al. ....................... 345/174 |

FOREIGN PATENT DOCUMENTS

| JP | 2008-310550 A | 12/2008 |
| KR | 10-2008-0096352 A | 10/2008 |
| KR | 10 2008-0096976 A | 11/2008 |
| KR | 10 2008-0110477 A | 12/2008 |

OTHER PUBLICATIONS

Korean Office Action in KR 10-2010-0029951, dated Jun. 24, 2011 (Jeong, et al.).

* cited by examiner

*Primary Examiner* — Quan-Zhen Wang
*Assistant Examiner* — Tony Davis
(74) *Attorney, Agent, or Firm* — Lee & Morse, P.C.

(57) ABSTRACT

A touch screen panel includes a transparent substrate, a plurality of first sensing cells on the transparent substrate, the plurality of first sensing cells being connected in a first direction, a plurality of second sensing cells between the first sensing cells and insulated from the first sensing cells, the plurality of second sensing cells being connected in a second direction, a plurality of first connecting patterns connecting the first sensing cells in the first direction, a plurality of second connecting patterns intersecting the first connecting patterns and connecting the second sensing cells in the second direction, and insulating layers between the first and second connecting patterns, the insulating layers including edges with protrusions, the edges overlapping the second connecting patterns, and one or more protrusions at the edges protruding toward adjacent second sensing cells.

17 Claims, 3 Drawing Sheets

TOUCH SCREEN PANEL

BACKGROUND

1. Field

Example embodiments relate to a touch screen panel. More particularly, example embodiments relate to a touch screen panel that is prevented from malfunction by static electricity.

2. Description of the Related Art

A touch screen panel is an input device that selects contents displayed on a screen, e.g., an image display device, etc., using a person's hand or an object to input commands of a user. The touch screen panel is provided on a front face of the image display device and converts positions on the touch screen panel directly contacting the person's hand or object into electrical signals. Accordingly, the instruction selected at the contact position is received as an input signal. As the touch screen panel can replace a separate input device that is operated by being connected with the image display device, e.g., a keyboard or a mouse, the field of use of the touch screen panel is being expanded gradually.

The touch screen panel may include a resistive type, a light sensing type, a capacitive type, etc. For example, when the person's hand or object contacts the touch screen panel of the capacitive type, a conductive sensing pattern in the touch screen panel may sense a change in capacitance at the contact position relative to an adjacent position or ground electrode, etc., thereby converting the contact position into an electrical signal. In order to clearly determine the contact position on a contacting surface, the sensing pattern may include first sensing patterns connected in a first direction, second sensing patterns connected in a second direction interesting the first direction, and an insulating layer therebetween.

SUMMARY

Embodiments are directed to a touch screen panel, which substantially overcomes one or more of the problems due to the limitations and disadvantages of the related art.

It is therefore a feature of an embodiment to provide a touch screen panel with a patterned insulation layer that is configured to prevent malfunction caused by static electricity.

At least one of the above and other features and advantages may be realized by providing a touch screen panel, including a transparent substrate, a plurality of first sensing cells on the transparent substrate, the plurality of first sensing cells being connected in a first direction, a plurality of second sensing cells between the first sensing cells and insulated from the first sensing cells, the plurality of second sensing cells being connected in a second direction, a plurality of first connecting patterns connecting the first sensing cells in the first direction, a plurality of second connecting patterns intersecting the first connecting patterns and connecting the second sensing cells in the second direction, and insulating layers between the first and second connecting patterns, the insulating layers including edges with protrusions, the edges overlapping the second connecting patterns, and one or more protrusions at the edges protrude toward adjacent second sensing cells.

At least one protrusion may extend from each edge of the insulating layers toward a respective adjacent second sensing cell along the second direction.

A plurality of protrusions may extend from each edge of the insulating layers toward a respective adjacent second sensing cell along the second direction, the plurality of protrusions at each edge having a convexo-concavo shape as viewed from a plan view.

The second connecting patterns may be connected to the second sensing cells through upper portions of the insulating layers, the at least one protrusion overlapping start and end points of sections of the second connecting patterns that overlap respective upper portions of the insulating layers.

The protrusions may be integral with the insulating layers.

A thickness of the protrusions may be smaller than a thickness of the insulating layers.

The first sensing cells may have separate patterns on a same layer as the second sensing cells and may be electrically connected with the first connection patterns in the first direction through exposed regions of the first connecting patterns.

The second sensing cells and the second connecting patterns may be integrally formed in each row or column.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
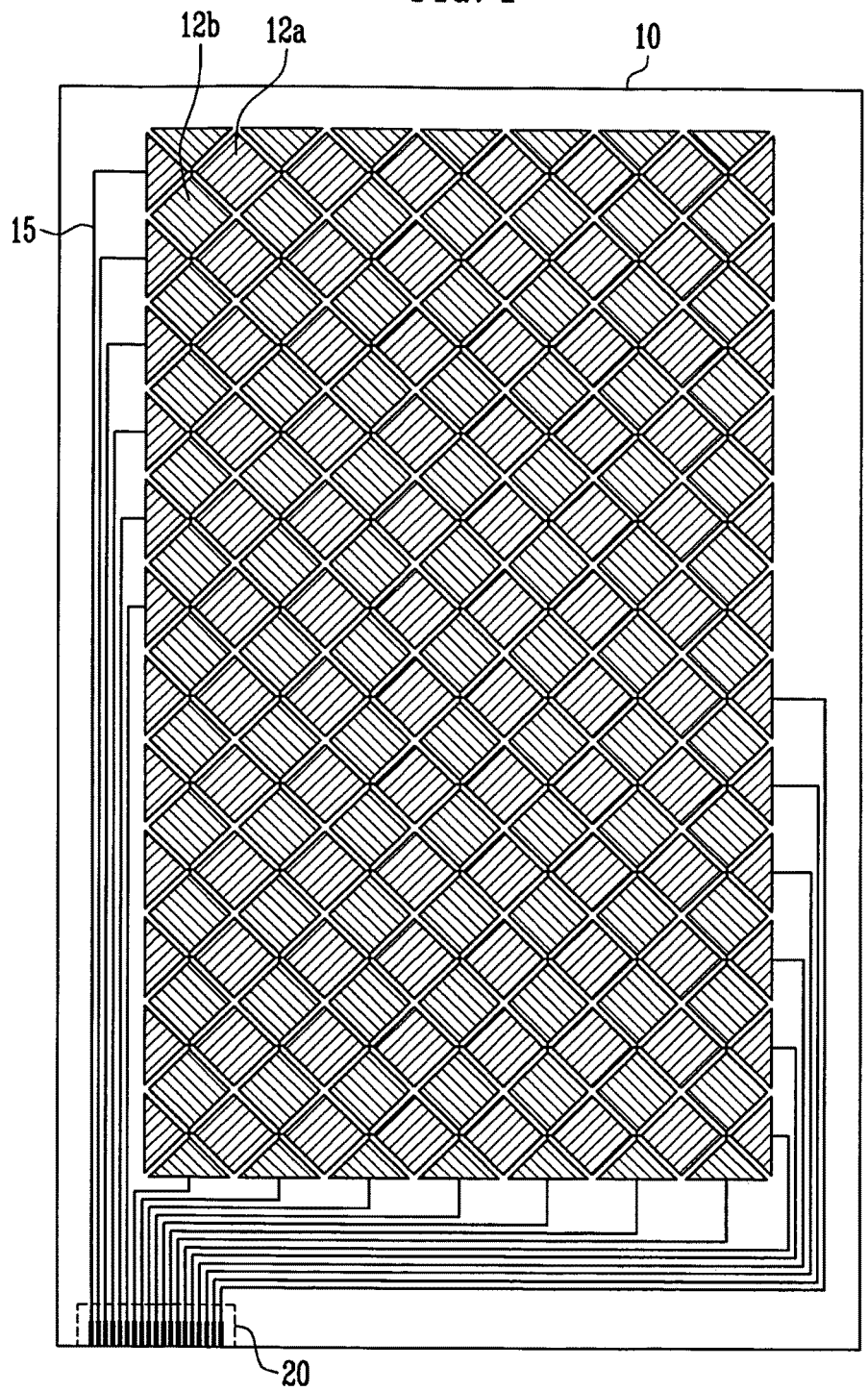
FIG. 1 illustrates a schematic plan view of a touch screen panel according to an embodiment.

Korean Patent Application No. 10-2010-0029951, filed on Apr. 1, 2010, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic plan view of a touch screen panel according to an embodiment. Referring to FIG. 1, a touch screen panel according to an embodiment may include a transparent substrate 10, a plurality of first sensing cells 12a and a second plurality of second sensing cells 12b formed on the first transparent substrate 10, position detection lines 15 connecting the first sensing cells 12a and the second sensing cells 12b with an external driving circuit (not shown) through a pad unit 20.

The first sensing cells 12a may be made of a transparent electrode material, e.g., ITO, and may be connected with the position detection lines 15 in each row in a first direction, e.g., in the row direction. The second sensing cells 12b may be made of a transparent electrode material, e.g., of a same material as the first sensing cells 12a, and may be disposed between the first sensing cells 12a to be insulated from the first sensing cells 12a in a second direction different from the first direction, e.g., in the column direction. The second sensing cells 12b may be in a same layer as the first sensing cells 12a, and may be connected with the position detection lines 15 in each column. When the first and second sensing cells 12a and 12b are disposed in the same layer, the touch screen panel may have substantially uniform transmittance.

The position detection lines 15 may connect the first and second sensing cells 12a and 12b with the external driving circuit, e.g., a position detection circuit, through the pad unit 20. The position lines 15 may be disposed at the edge portions of a touch screen panel without a touch active region where an image is displayed, and may be made of any suitable material. For example, the position lines 15 may be formed of a low-resistance material, e.g., Mo, Ag, Ti, Cu, Al, and Mo/Al/Mo, the transparent electrode material used for making the first and second sensing cells 12a and 12b, etc.

The touch screen panel described above is a capacitive type touch screen panel. Therefore, when a contact object, e.g., a user's hand or a stylus pen, contacts the touch screen panel, a change of electrostatic capacitance corresponding to the contact position is transmitted to the driving circuit (not shown) from the sensing cells 12a and 12b through the position detection lines 15 and the pad unit 20. Further, the change in the electrostatic capacity is converted into an electric signal by an X- and Y-input process circuit (not shown), such that the contact position is located.

Figure 2:
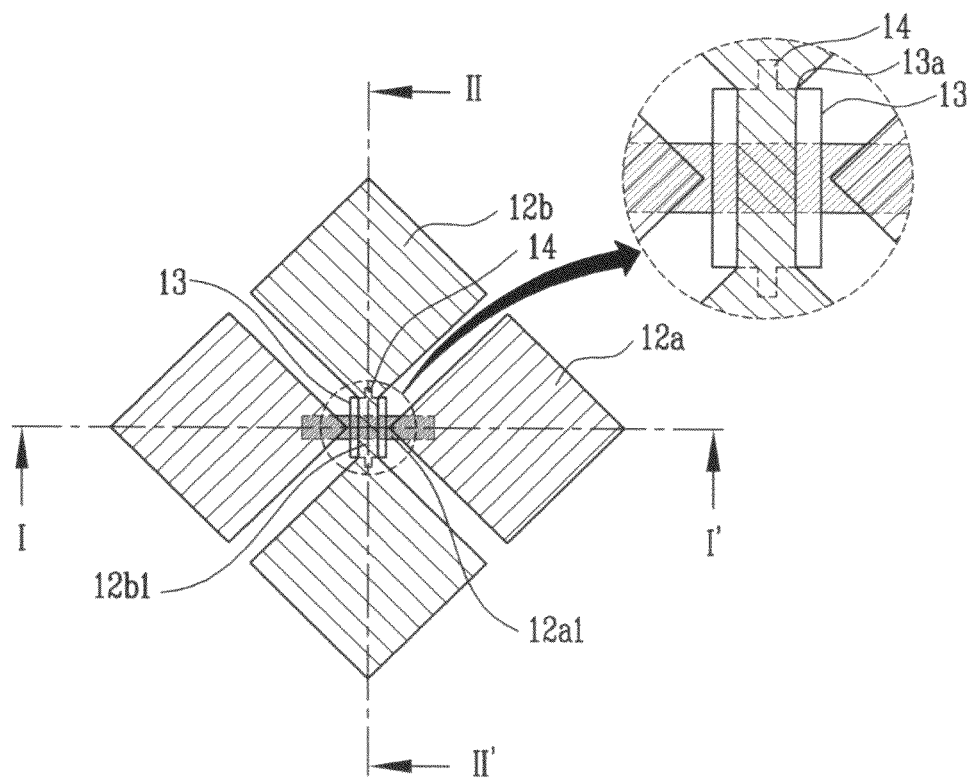
FIG. 2 illustrates an enlarged plan view of connected sensing cells according to an embodiment.
Figure 3:
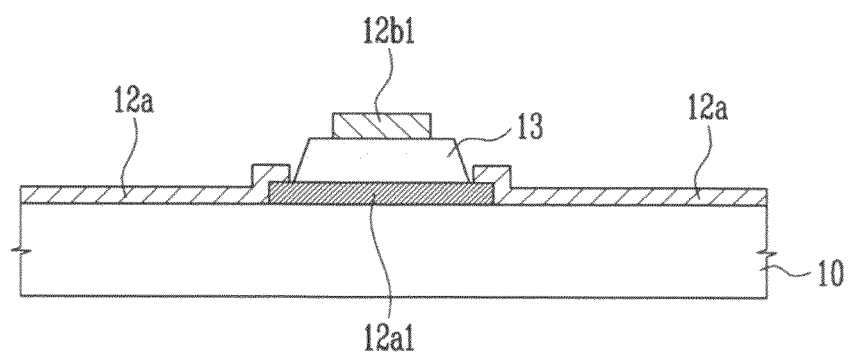
FIG. 3 illustrates a cross-sectional view taken along line I-I' of FIG. 2.

FIG. 2 illustrates an enlarged plan view of the first and second sensing cells 12a and 12b with an insulating layer therebetween according to an embodiment. FIG. 3 illustrates a cross-sectional view taken along line I-I' of FIG. 2, and FIG. 4 illustrates a cross-sectional view taken along line II-II' of FIG. 2.

Figure 4:
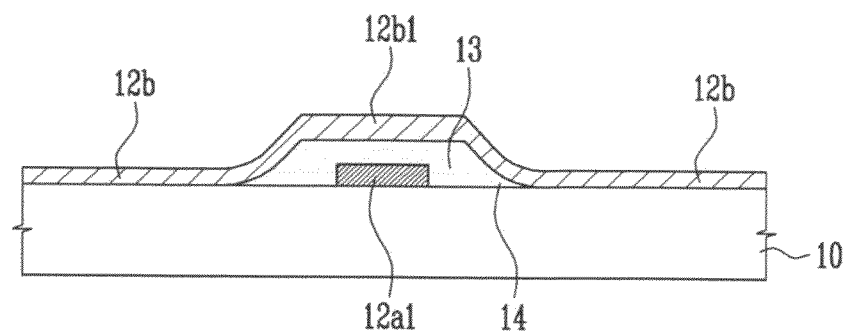
FIG. 4 illustrates a cross-sectional view taken along line II-II' of FIG. 2.

For convenience, although one first connecting pattern and one second connecting pattern are shown in FIGS. 2 to 4, the same structure can be applied to the first connecting patterns and the second connecting patterns, which are not shown. Therefore, a plurality of first connecting patterns and second connecting patterns are inclusively described hereafter, and 'first connecting pattern' and 'second connecting pattern', respectively, imply a plurality of connecting patterns.

Referring to FIG. 2, the first sensing cells 12a may be patterned to be separate from each other, and may be in a same layer as the second sensing cells 12b. The first sensing cells 12a may be connected to each other in the first direction by first connecting patterns 12a1. For example, the first sensing cells 12a and the first connecting patterns 12a1 may be formed in a same layer, e.g., both the first sensing cells 12a and the first connecting patterns 12a1 may be formed directly on the transparent substrate 10.

The first connecting patterns 12a1 may be patterned to be separate from each other, e.g., each first connecting pattern 12a1 may connect two adjacent first sensing cells 12a and may be completely separated from an adjacent first connecting pattern 12a1. A plurality of first connecting patterns 12a1 may be disposed in a line in the first direction, e.g., in the row direction.

The first connecting patterns 12a1 may be made of a transparent electrode material, e.g., of a same material as the first and second sensing cells 12a and 12b, or of a low-resistance opaque electrode material. Widths of the first connecting patterns 12a1 may be adjusted to prevent or substantially minimize visibility of the first connecting patterns 12a1.

The second sensing cells 12b may be disposed between the first sensing cells 12a to be insulated from the first sensing cells 12a, and may be connected in the second direction by second connecting patterns 12b1. The second connecting patterns 12b1 may intersect the first connecting patterns 12a with an insulating layer 13 therebetween. That is, the second connecting patterns 12b1 may be formed to intersect the first connecting patterns 12a through the upper portion of the insulating layers 13 to connect the second sensing cells 12b in the second direction.

The second connecting patterns 12b1 may be patterned to be integrally formed with the second sensing cells 12b, e.g., may be formed in a same patterning process. For example, the second connecting patterns 12b1 may be integrally formed with the second sensing cells 12b in each column. It is noted, however, that the above described configuration of the second sensing cells 12b is just an example and example embodiments are not limited thereto, e.g., the second connecting patterns 12b1 may be integrally formed with the second sensing cells 12b in each row or the first connecting patterns 12a1 may be connected in each column.

As illustrated in FIG. 3, the insulating layer 13 may be formed on the first connecting patterns 12a1. For example, the insulating layer 13 may be partially positioned on the first connecting patterns 12a1 to expose portions, e.g., edges, of the first connecting patterns 12a1, e.g., the exposed portions may be contact regions of the first connecting patterns 12a1 and the first detecting cells 12a. That is, the first sensing cells 12a may be in direct contact with the first connecting patterns 12a1 above the exposed regions of the first connecting patterns 12a1, and may be electrically connected to the first connecting patterns 12a1 in the first direction through the exposed regions of the first connecting patterns 12a1.

The second sensing cells 12b may be disposed between the first sensing cells 12a in the same layer as the first sensing cells 12a. As illustrated in FIG. 4, the second sensing cells 12b may be connected in the second direction by the second connecting patterns 12b1 through the upper portion of the insulating layers 13, e.g., the second connecting patterns 12b1 may be positioned over the insulating layer 13 to be connected to the second sensing cells 12b. As described previously, the second sensing cells 12b may be formed integrally with the second connecting patterns 12b1, e.g., the second sensing cells 12b and the second connecting patterns 12b1 may be patterned to be connected in a same patterning process. It is noted, however, that the above described configuration is just an example, and example embodiments are not limited thereto, e.g., the second sensing cells 12b and the second connecting patterns 12b1 may be separately patterned on different layers to be electrically connected through contact holes.

The second connecting patterns 12b1 may be formed to have smaller widths than the second sensing cells 12b. For example, when the second connecting patterns 12b1 and the second sensing cells 12b are integrally formed, transparent electrode patterns having diamond shapes, i.e., the second sensing cells 12b, may have narrow bridge shapes with narrow widths therebetween, i.e., the second connecting patterns 12b1. Therefore, as described above, the second connecting patterns 12b1 may have smaller widths than the adjacent second sensing cells 12b, while being connected through the upper portion of the insulating layers 13.

However, as the second connecting patterns 12b1 have smaller widths than the second sensing cells 12b, resistance around start and end points of a section of the second connecting patterns 12b1 crossing, i.e., overlapping, the upper portion of the insulating layers 13 may locally increase.

Therefore, according to example embodiments, the insulating layer 13 may be patterned to increase a contact area between the insulating layer 13 and the second connecting patterns 12b1.

That is, as illustrated in FIG. 2, the insulating layer 13 may be patterned to have one or more protrusions 14 protruding toward adjacent second sensing cells 12b, e.g., the protrusions 14 may be integral with the insulating layer 13. In detail, the protrusions 14 may be at the end portions of the insulating layer 13 overlapping the second connecting patterns 12b1, e.g., one protrusion 14 may be formed at each edge 13a of the insulating layer 13 that overlaps the second connecting patterns 12b1. For example, as illustrated in FIG. 4, the protrusions 14 may extend on, e.g., directly on, the transparent substrate 10, and may have a substantially smaller thickness along a vertical direction, i.e., a direction substantially normal to a plane supporting the transparent substrate 10, than the insulating layer 13. For example, the thickness of the insulating layer 13 along the vertical direction may decrease gradually to form a protrusion 14 with a pointed edge, e.g., so the second connecting patterns 12b1 may completely overlap the insulating layer 13 and the protrusion 14. A width of the protrusion 14 along the first direction may be smaller than a width of the insulating layer 13 along the first direction. Formation of the protrusion 14 may increase the contact area between the insulating layer 13 and the second connecting patterns 12b1, so joule-heating due to the static electricity at edges of the insulating layer 13 may be dispersed.

In further detail, as both ends of a region where the insulating layer 13 overlaps the second connecting patterns 12b1 may be vulnerable to static electricity, the protrusions 14 may protrude toward the adjacent second sensing cells 12b from both ends of the insulating layer 13 to increase an overlap area between the insulating layer 13 and the second connecting patterns 12b1. Therefore, joule-heating due to static electricity may be dispersed, and even if the second connecting patterns 12b1 are partially damaged, the effect may be relatively reduced. As such, a short circuit may be prevented in the second connecting patterns 12b1, thereby increasing stability of the touch screen panel.

In contrast, joule-heating may concentrate at intersections of second connecting patterns with conventional insulating layers, e.g., insulating layers without protrusions, when static electricity is applied from the outside, such that a short and malfunction may be caused in the touch screen panel. For example, as start and end points of a region of the second connecting patterns that overlap the conventional insulating layer may be vulnerable to static electricity and may be easily damaged, the start and end points may be short-circuited due to the static electricity.

Figure 5:
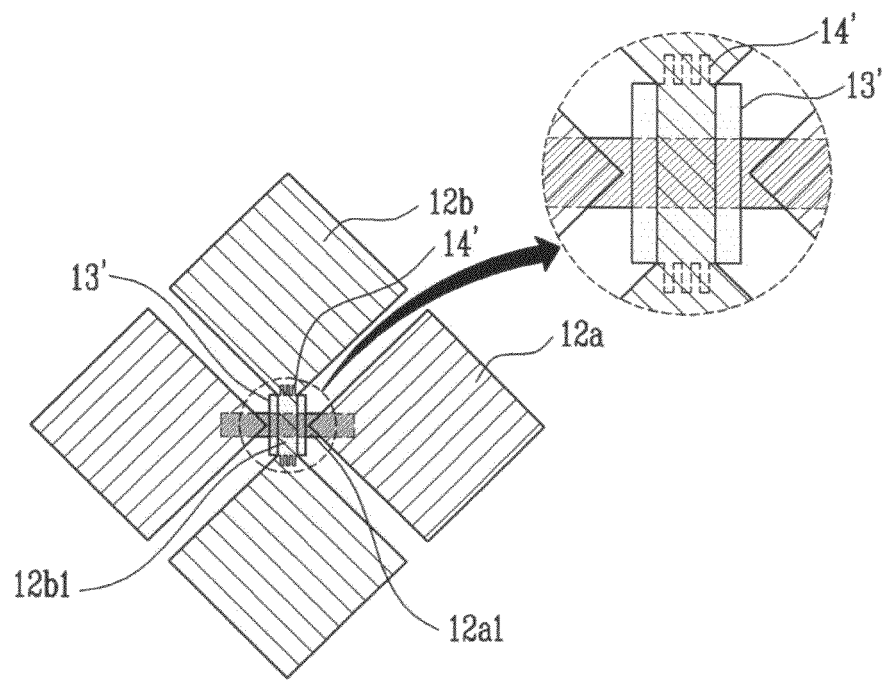
FIG. 5 illustrates a plan view of an insulating layer according to another embodiment.

According to another example embodiment illustrated in FIG. 5, a touch screen panel may include an insulating layer 13' patterned to have a convexo-concavo shape as viewed from a plan view to have a plurality of protrusions 14' at each edge overlapping the second connecting patterns 12b1. For example, as illustrated in FIG. 5, three parallel protrusions 14' may extend from each edge of the insulating layer 13' overlapping the second connecting patterns 12b1 toward an adjacent second connecting pattern 12b1. In this configuration, as the start and end points of the section where each of the second connecting patterns 12b1 crosses the upper portion of the insulating layer 13 overlaps the protrusions 14', the contact area between the insulating layer 13' and the second connecting patterns 12b1 may increase. Therefore, it may be possible to more effectively protect the touch screen from static electricity.

It is noted that although it was exemplified in the above that the insulating layers 13 and 13' have the protrusions 14 and 14' to increase the contact area between the insulating layers 13 and 13' and the second connecting patterns 12b1 at the regions that are vulnerable to static electricity, for the convenience of description, it may be construed that the insulating layers 13 and 13' may have depressions. Further, the direction and shape of the protrusions 14 and 14' formed at the insulating layers 13 and 13' are not limited to the shape and the direction shown in FIGS. 2 and 5. For example, the insulating layers 13 and 13' may be patterned to have a convex-concavo shape on the cross section, and the shape and direction of the protrusions 14 and 14' formed at the insulating layers 13 and 13' may be modified in various ways.

According to example embodiments, the insulating layers disposed between the first connecting patterns and the second connecting patterns may be patterned to have protrusions that protrude toward adjacent second sensing cells at the end portion of the region where the insulating layers overlap the second connecting patterns, such that the contact area between the insulating layers and the second connecting patterns may increase. Therefore, it may be possible to prevent a short in the second sensing cells and ensure stability of the touch screen panel by dispersing the joule-heating due to the static electricity.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising: a transparent substrate; a plurality of first sensing cells on the transparent substrate, the plurality of first sensing cells being connected in a first direction; a plurality of second sensing cells between the first sensing cells and insulated from the first sensing cells, the plurality of second sensing cells being connected in a second direction; a plurality of first connecting patterns connecting the first sensing cells in the first direction; a plurality of second connecting patterns intersecting the first connecting patterns and connecting the second sensing cells in the second direction; and insulating layers between the first and second connecting patterns, the insulating layers including edges with protrusions, the edges overlapping the second connecting patterns, one or more protrusions extending from respective edges toward adjacent second sensing cells, wherein the protrusions are integral with the insulating layers, and a width of each protrusion along the first direction being smaller than a width of a respective edge along the first direction, wherein at least one protrusion extends from each edge of the insulating layers toward a respective adjacent second sensing cell along the second direction, and wherein a plurality of protrusions extends from each edge of the insulating layers toward a respective adjacent second sensing cell along the second direction, the plurality of protrusions at each edge having a convexo-concavo shape as viewed from a plan view.

2. The touch screen panel as claimed in claim 1, wherein at least one protrusion extends from each edge of the insulating layers toward a respective adjacent second sensing cell along the second direction.

3. The touch screen panel as claimed in claim 2, wherein a plurality of protrusions extends from each edge of the insulating layers toward a respective adjacent second sensing cell along the second direction, the plurality of protrusions at each edge having a convexo-concavo shape as viewed from a plan view.

4. The touch screen panel as claimed in claim 1, wherein the second connecting patterns are connected to the second sensing cells through upper portions of the insulating layers, the at least one protrusion overlapping start and end points of sections of the second connecting patterns that overlap respective upper portions of the insulating layers.

5. The touch screen panel as claimed in claim 1, wherein a plurality of protrusions extends from each edge of the insulating layers toward a respective adjacent second sensing cell along the second direction, the plurality of protrusions at each edge being completely spaced apart from each other along the first direction.

6. The touch screen panel as claimed in claim 1, wherein the protrusions extend only along the second direction, edges of the insulating layers along the second direction having no protrusions.

7. The touch screen panel as claimed in claim 1, wherein a thickness of the protrusions is smaller than a thickness of the edges of the insulating layers, the thicknesses of the protrusions and insulating layers being measured along a normal to the transparent substrate.

8. The touch screen panel as claimed in claim 7, wherein the thickness of the insulating layers as measured at the edges decreases gradually toward ends of respective protrusions.

9. The touch screen panel as claimed in claim 1, wherein the first sensing cells have separate patterns on a same layer as the second sensing cells and are electrically connected with the first connection patterns in the first direction through exposed regions of the first connecting patterns.

10. The touch screen panel as claimed in claim 1, wherein the second sensing cells and the second connecting patterns are integral with each other in each row or column.

11. The touch screen panel as claimed in claim 1, wherein the second connecting patterns completely cover respective protrusions, the protrusions being completely enclosed between the transparent substrate and the respective second connecting patterns.

12. The touch screen panel as claimed in claim 1, wherein a longitudinal direction of each insulating layer extends along the second direction, a width of each insulating layer extending along the first direction and being smaller than a length along the second direction.

13. The touch screen panel as claimed in claim 12, wherein each insulating layer includes:
   a main portion having length and width along the second and first directions, respectively; and
   the protrusions extending from edges of the main portion along the second direction, each protrusion having length and width along the second and first directions, respectively, that are smaller than respective length and width of the main portion.

14. The touch screen panel as claimed in claim 12, wherein each insulating layer includes two portions having different lengths and different widths, the first portion being between the first and second connecting patterns, and the second portion being at least one protrusion connected to and extending directly from a lateral edge of the first portion.

15. The touch screen panel as claimed in claim 1, wherein bottom surfaces of the protrusions are coplanar with at least a portion of a bottom surface of the insulting layer, each of the coplanar surfaces of the protrusions and insulating layer being in direct contact with the transparent substrate.

16. The touch screen panel as claimed in claim 1, wherein each insulting layer is a uniform, seamless structure with at least one corresponding protrusion.

17. The touch screen panel as claimed in claim 1, wherein the insulting layers and the corresponding protrusions include a same material.

* * * * *